Sept. 1, 1964  F. J. HANBACK  3,147,015
SEAL RING
Filed March 24, 1960  3 Sheets-Sheet 1

INVENTOR.
FRANK J. HANBACK
BY
RICHEY, McNENNY & FARRINGTON
ATTORNEYS

Sept. 1, 1964     F. J. HANBACK     3,147,015
SEAL RING

Filed March 24, 1960     3 Sheets-Sheet 2

INVENTOR.
FRANK J. HANBACK
BY
RICHEY, McNENNY & FARRINGTON
ATTORNEYS

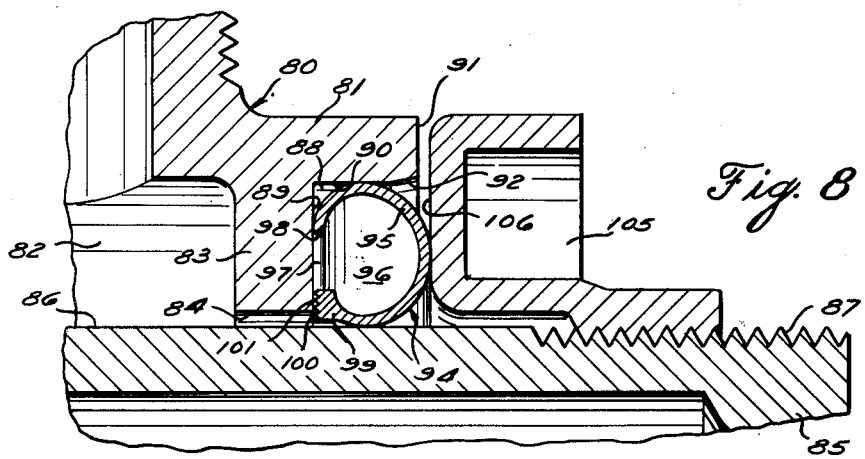
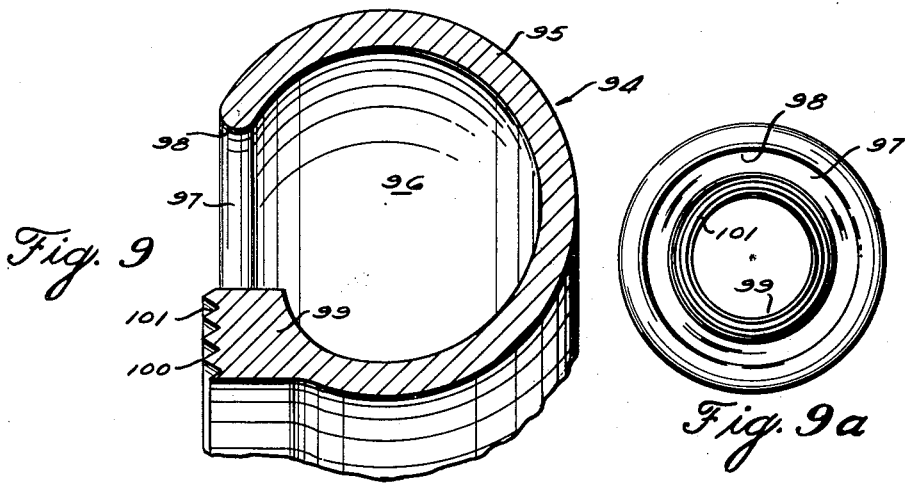
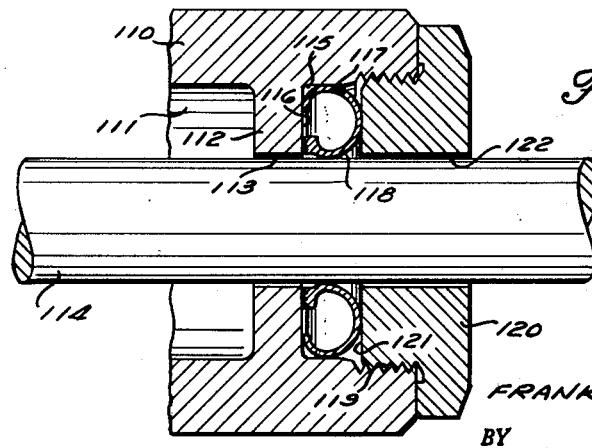

United States Patent Office 3,147,015
    Patented Sept. 1, 1964

3,147,015
SEAL RING
Frank J. Hanback, Palos Verdes Estates, Calif., assignor to The Weatherhead Company, Cleveland, Ohio, a corporation of Ohio
Filed Mar. 24, 1960, Ser. No. 17,339
6 Claims. (Cl. 277—205)

This invention relates in general to fluid pressure seals, and more particularly to pressure assisted seals adapted to prevent fluid leakage between relatively movable fluid pressure coupling or fitting members such as swivel joints and the like.

A principal object of this invention is to provide a pressure assisted seal for use with fluid pressure couplings and fittings having relatively movable parts, the seal functioning to prevent fluid pressure leakage at the movable joint of such couplings and fittings when exposed to high fluid pressures and/or high ambient temperatures.

One application of the sealing ring is in a rotary swivel joint fitting for use at high pressures and/or at elevated temperatures. The sealing ring is separate from the other fitting members and is made from a metal having the required strength and stability for service at elevated temperatures. The ring is hollow, having walls of substantially uniform thickness which surround an annular chamber which is connected to the fluid under pressure. The axially inner portion of the ring next to the fluid under pressure is formed to provide an annular gap in the ring wall. The inner edge of the ring wall is substantially thicker than the remainder of the wall. This heavier portion forms a stiffening rib which limits the amount of deflection of the ring wall into the bearing space between the relatively movable members. The annular gap not only allows the admission of the fluid into the annular chamber, but also permits radial deflection of the radially inner and outer portions of the ring into sealing contact with the adjacent surfaces of the fitting members. By choosing materials and finishes which allow a sliding bearing contact between the sealing ring and the swivel joint members, a sealing contact with relatively low friction is effectively maintained regardless of the sliding movement between the swivel members and the sealing ring.

The walls of the ring are made sufficiently thin so as to be resiliently flexible when subjected to fluid under pressure. As a result of this flexibility, the total sealing contact pressure consists of a relatively small fixed static pressure component created by the initial compression of the ring as installed and of a variable dynamic pressure component which is directly proportional to the pressure of the fluid contained within the coupling or fitting. This feature ensures a fluid-tight seal at high pressures without the need for high static seal contact pressure. At low internal fluid pressure such high static seal pressure is unnecessary to prevent leakage, and such pressures cause rapid wear of the sealing ring as well as high friction between the swivel joint members.

It is another object of this invention to provide a sealing ring of the character described in the preceding object and which is equally adaptable for use in sealing between both axially slidable members and relatively rotating members, including members having a combination of the two motions.

It is another object of this invention to provide a pressure assisted resilient sealing ring which is easily assembled and then subjected to a change in shape by mechanical compression to produce a fluid pressure seal.

It is a further object of this invention to provide a sealing ring according to the preceding object which will permit the coupling or fitting and the sealing ring to be used, disassembled, reassembled and reused without replacement of any component parts except as necessitated by normal wear and usage.

It is still another object of this invention to provide a simplified swivel joint coupling or fitting for use between angularly rotatable members which is adaptable for use with both liquid and gaseous media under high pressures and/or at high ambient temperatures.

It is a further object of the invention to provide a sealing ring according to the preceding objects which is also a bearing.

Other and additional objects and advantages of the invention will become apparent from an examination of the accompanying drawings and the following detailed description of the invention.

In the drawings:

FIG. 8 is an enlarged fragmentary cross-sectional view of a coupling employing another embodiment of the sealing ring;

FIG. 9 is an enlarged cross-sectional view showing the sealing ring of FIG. 8 in greater detail;

FIG. 9a is an elevational view of the ring showing the spiral grooves on the face of the rib on the ring; and FIG. 10 is a fragmentary longitudinal sectional view showing the sealing ring used for a piston rod seal.

Figures 1, 2, 3:
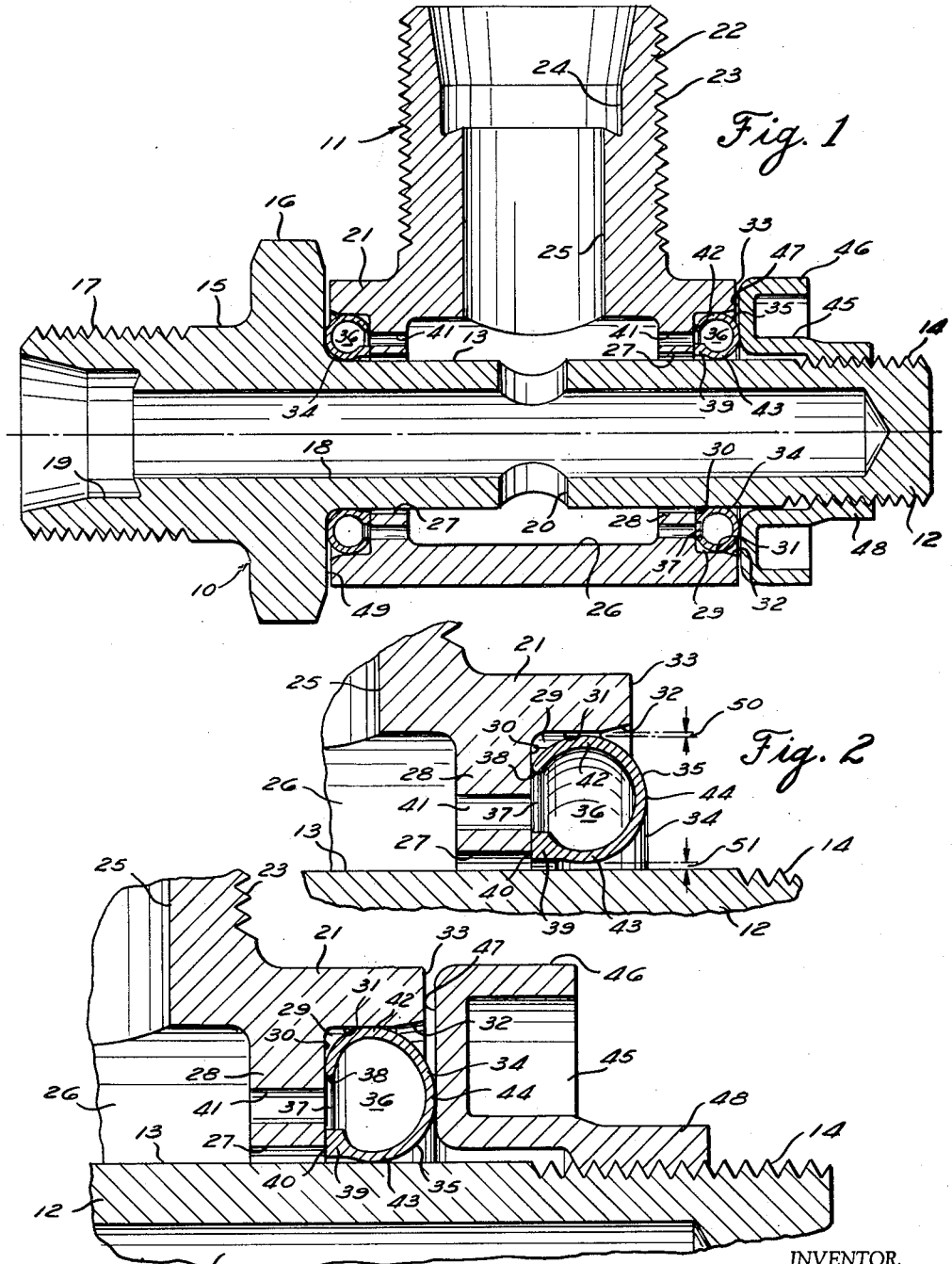
FIG. 1 is a longitudinal cross-sectional view of a preferred embodiment of the swivel joint coupling according to the present invention.
FIG. 2 is an enlarged fragmentary cross-sectional view of the sealing ring assembled to the coupling before the clamping nut has been tightened.
FIG. 3 is an enlarged fragmentary cross-sectional view similar to that of FIG. 2 but showing the sealing ring after the clamping nut has been tightened.

Referring now to the drawings in greater detail, FIG. 1 shows a swivel joint coupling such as that used in connecting fluid supply lines. In the usual manner of installation of this type of fitting, the body member 10 may be considered as fixed while the manifold 11 provides the swiveling action by rotating about the body member. In order to allow the manifold 11 to rotate, the body member 10 is provided with an elongated shaft portion 12 having a cylindrical outer surface 13. The outer end of the shaft portion 12 is provided with external screw threads 14, while the other end is joined to an enlarged fitting section 15. This fitting section 15 has an enlarged wrench receiving portion 16 extending radially outward adjacent shaft portion 12. This section is also provided with a portion having external screw threads 17 to receive a suitable tube or hose coupling.

An elongated bore 18 extends axially through the body member 10 from the fitting section 15 and terminates at a point adjacent the screw threads 14. The bore 18 is positioned concentric with the cylindrical outer surface 13 of the shaft portion 12, and at the fitting end, the bore 18 opens into an enlarged counterbored recess 19 of appropriate configuration to receive a tube and tube coupling. Midway between wrench receiving portion 16 and screw threads 14, the shaft portion 12 is provided with a transverse bore 20 which intersects the axial bore 18 to allow fluid to move between the axial bore 18 and the manifold 11.

The manifold 11 is generally T-shaped, having a sleeve section 21 intersected at its midpoint by an integral fitting section 22 which extends radially outward therefrom. The manifold fitting section 22 is provided at its outer end with external screw threads 23 and an internal counterbore recess 24 which is adapted to receive a tube coupling in the same manner as the fitting section 15 on the body member 10. A bore 25 extends radially outward through this manifold fitting section 22 to connect recess 24 with an enlarged sleeve chamber 26 in the sleeve section 21. This enlarged sleeve section 26 forms a portion of an axially extending bore 27 which passes through the sleeve section 21 to receive shaft portion 12. At each end of the sleeve chamber 26 are located annular walls or ribs 28 having for their inner peripheral surface the axial bore 27 which has a diameter sufficiently larger than that of cylindrical surface 13 to allow a relatively drag free clearance between the manifold 11 and shaft portion 12.

At each end of the sleeve section 21 there is an annular recess or counterbore 29 formed by the radially extending outer surface 30 of the annular walls or ribs 28 and by the axially extending cylindrical wall surface 31. A chamfer 32 is provided at the outer portion of cylindrical wall surface 31 adjacent the radially extending end surface 33 of the sleeve section 21 to provide a guide for the sealing ring when the swivel joint fitting is being assembled.

A sealing ring 34 is positioned within each of the annular recesses 29 to seal against leakage of fluid within the sleeve chamber 26 outward through the joint formed by shaft portion 12 and the axial bore 27 in the manifold 11. As shown in FIG. 2, the sealing ring before installation is generally circular in cross section, having a relatively thin, flexible and resilient wall 35 which forms an annular internal chamber 36. The axially inner side of the ring wall 35 is formed to provide a gap 37 which extends continuously around the ring. Adjacent the gap 37, the radially outer portion of the ring wall 35 forms a rounded edge 38 of the same thickness as the remainder of the wall. On the inner side of the gap 37, the ring wall 35 is thickened to form a stiffening rib 39 having a radially extending face 40 which is in abutting contact with outer surface 30 of the annular rib 28. Radially outward of stiffening rib 39, the annular ribs 28 of manifold 11 are each provided with a series of holes or passages 41 extending between sleeve chamber 26 and the ring wall gap 37. The number and spacing of the holes or passages 41 may be varied as desired so long as they allow the pressurized fluid within the sleeve chamber 26 to communicate with the annular chamber 36 within sealing ring 34. This provides means for subjecting the interior of the sealing ring to the same fluid pressure as exists within the fitting.

In order to retain the manifold 11 on the body member 10, as well as to provide the necessary axial compression for the sealing rings 34, as will be described in greater detail hereinafter, a nut 45 is threaded onto the screw threads 14 on the outer end of shaft portion 12. Nut 45 is provided with a wrench receiving portion 46 on the axially inner end of which is a radially extending face 47. To prevent possible loosening of nut 45 as the manifold 11 rotates about the body member 10, the nut has a shank portion 48 having self locking threads to engage screw threads 14.

When the swivel joint is assembled, the sealing rings 34 are placed inside the annular recess 29 on the manifold 11 with the annular gap 37 facing inward. The manifold is then assembled with body member 10 by inserting the shaft portion 12 through the axial bore 27 of the manifold, after which nut 45 is screwed on the threaded portion 14. The uncompressed sealing rings are made a loose fit within the recesses 29 so that the radially outer peripheral portion 42 of the sealing ring wall 35 is spaced away from the cylindrical recess wall 31 by a gap 50, and in like manner the radially inner peripheral portion 43 of the sealing ring wall 35 is spaced away from cylindrical surface 13 on shaft portion 12 by a gap 51.

The axial depth of the annular recess 29 is made proportionally less than the axial thickness of the sealing ring 35 so that the axially outer portion 44 of the ring extends beyond the end face 33. When the nut 45 is drawn up, the sealing rings at each end of the sleeve abut against the radially extending faces 47 and 49 on nut 45 and wrench receiving portion 16, respectively. Since the manifold member 11 is otherwise free to position itself axially along the shaft portion 12 and is therefore self centering, the axial compression produced by further tightening of nut 45 is applied equally to the sealing rings at each end of the manifold member 11.

As the sealing ring is further compressed, the ring is changed from its generally circular cross section into an elliptical shape wherein the major axis of the ellipse extends transversely to the compressive force. Therefore, the compressive force applied to the sealing ring displaces the axial outer wall portion 44 of the sealing ring inwardly toward outer surface 30 of annular rib 28 and at the same time bends the radially outer wall portion 42 outwardly towards the cylindrical wall surface 31 and also bends the radially inner wall portion 43 inwardly towards the cylindrical shaft surface 13. When the gaps 50 and 51 have been fully closed, as shown in FIG. 3, radial face 47 of nut 45 is spaced away from the end face 33 of the manifold member 11 to prevent frictional contact between these members. At this point, the sealing ring provides sealing engagement between the outer surface 30 of annular rib 28 both at the stiffening rib 39 and the outer gap edge 38, as well as sealing along the axial surfaces of cylindrical wall surface 31 and cylindrical shaft surface 13.

It will now be seen, as shown in FIG. 3, that the compressed sealing ring 34 is, in effect, enclosed within an annular chamber having a rectangular cross section bounded radially by the cylindrical shaft surface 13 and recess wall 31, and bounded axially by the outer rib surface 30 and nut face 47.

When the swivel joint is exposed to fluid pressure, the pressure in sleeve chamber 26 will be communicated through axial passages 41 and annular gap 37 into the annular chamber 36 within sealing ring 34. Since the sealing ring wall 35 is resiliently flexible, the fluid pressure within annular chamber 36 will tend to further force the ring wall into sealing contact with the adjacent fitting surfaces. Thus the static sealing pressure resulting from the compression of the sealing ring by nut 45 is supplemented by the sealing pressure produced by the fluid pressure within the sealing ring. Accordingly, the sealing contact pressure varies with the changes in pressure within the sleeve chamber 36. Higher fluid pressures provide higher sealing contact pressures, and conversely, lower sealing contact pressures are obtained by lower fluid pressures.

As the sealing contact pressure increases, the area of contact between the sealing ring and the recess walls also increases as a result of the flattening of the sealing ring walls against the walls of the recess. While this increase in contact area improves sealing efficiency, it also causes a widening of the annular gap 37 as the gap edges 38 and 39 are radially displaced from each other. Since the thickened rib 39 forming the inner edge of gap 37 has greater rigidity than outer edge 38 and therefore has greater resistance to a change in diameter, the compensation for the increase in wall contact area is mostly made by the displacement of the outer edge 38. The thickened rib portion 39 remains in firm abutting contact with the outer side 30 of annular manifold rib 28 along its radially extending bearing face 40. This rigidity of the thickened rib portion 39 prevents possible wedging of the sealing ring into the clearance space between cylindrical shaft surface 13 and manifold bore 27. In addition, the fact that thickened rib portion 39 is spaced away from cylindrical shaft surface 13 serves to limit the amount of flattening of the radially inner wall portion 43 along this surface and prevents an excessive increase in the size of the sealing contact area between the sealing ring 34 and the shaft surface 13, which increase would create an excessively high frictional resistance to the rotation of the swivel members.

Figure 4:
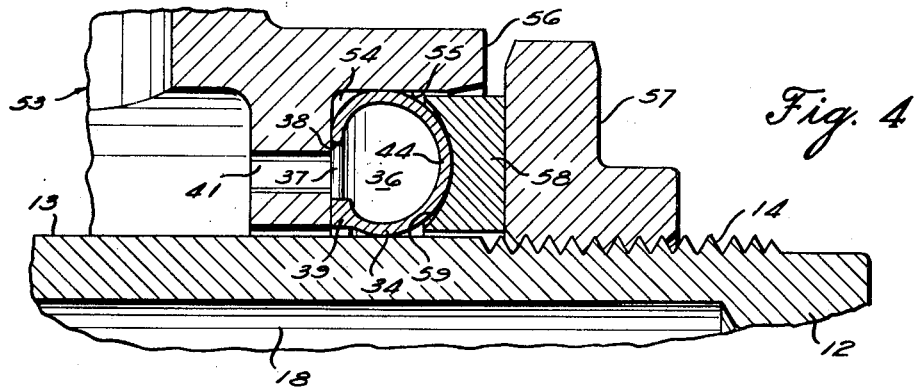
FIG. 4 is a fragmentary cross-sectional view similar to that of FIG. 3, but showing a modified form of the coupling.

FIG. 4 shows a modified clamping nut construction which is particularly adapted for use at very high pressures or when the sealing ring wall is quite thin and flexible. The sealing ring 34 is mounted within an annular recess 54 in manifold 53 in the same manner as in annular recess 29 on the manifold 11 in the embodiment shown in FIGS. 1 through 3. In this embodiment, however, the cylindrical outer wall 55 of the recess 54 extends outward beyond the axially outer surface of the sealing ring 34 to terminate in an annular face 56. A self-locking nut 57 is screwed on the threaded portion 14 of shaft 12 in the same manner as nut 45. Between the inner surface of nut 57 and the sealing ring 34, an annular bearing ring 58 serves as a contact member between the nut 57 and the sealing ring 34. The inner surface of bearing ring 58 has a shallow annular groove 59 having a radius of curvature slightly greater than the radius of curvature of the outer wall surface of the sealing ring. When nut 57 is tightened to compress the sealing ring 34, the axially outer wall portion 44 of the sealing ring tends to conform with the surface of annular groove 59. When the ring is placed under pressure as a result of the fluid pressure within annular chamber 36, the axially outer wall portion 44 will deflect to conform with the curvature of annular groove 59. Thus bearing ring 58 and annular groove 59 provide greater support with less compression of the sealing ring.

Figures 5, 6:
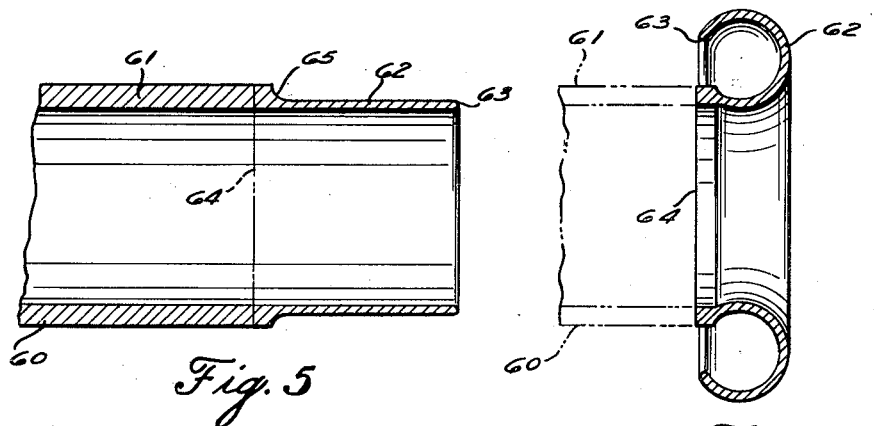
FIG. 5 is a longitudinal cross-sectional view of a tube end partially formed during one method of making the sealing rings.
FIG. 6 is a longitudinal cross-sectional view of the sealing ring showing further details of the ring as formed from the tube shown in FIG. 5.
Figure 7:
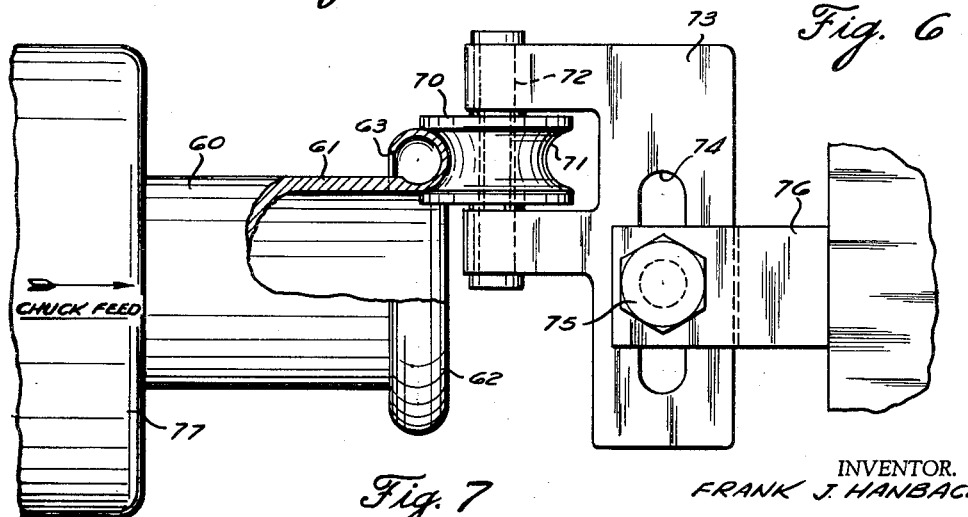
FIG. 7 is an elevational view showing the method of forming the sealing ring of FIG. 6 from the partly formed tube end shown in FIG. 5.

A preferred method of making the sealing ring 34 is shown in FIGS. 5 through 7. A seamless tube 60 of a suitable metal such as aluminum, copper, or stainless steel, is selected to have a wall 61 of a diameter and thickness equal to that of thickened rib 39. The outer end portion of tube wall 61 is turned down along its outer surface to form a thin wall portion 62 retaining the inner wall surface unchanged in diameter. The outer end 63 of thin wall portion 62 is rounded, and between the thin wall portion 62 and the original wall 61 is a fillet 65 having a radius approximately equal to the radius of annular chamber 36.

The cylindrical thin wall portion 62 may be formed into sealing ring 34 by means of a beading operation using the apparatus shown in FIG. 7. A beading roller 70 is provided with a rounded annular groove 71 corresponding in shape to the outer surface of the sealing ring to be made. The beading roller 70 is rotatably mounted on a suitable shaft 72 held on a rigid bracket 73. Bracket 73 is shown as being adjustably fastened to a mounting member 76 by means of slot 74 and bolt 75. The tube 60 is clamped within a rotatable chuck 77 which is constructed to feed the tube axially during rotation toward the beading roller 70 whereby the annular groove 71 curls turned down wall portion 62 as shown in FIG. 5 outwardly to form the sealing ring wall 35 as shown in FIG. 6. After the beading operation has been completed, the outer surface of the ring is polished to a smooth finish, and the finished sealing ring is cut off from the tube 60 as shown at 64 by means of the usual cut-off tool. It will be noted that beading roller 70 is radially positioned relative to the turned down tube wall 62 so that as the sealing ring is formed, the radially inner wall portion 43 is reduced in diameter slightly below that of tube wall 61 to insure that the thickened rib portion 39 will remain out of contact with the shaft member when the seal is installed in place.

A modified version of the sealing ring is shown in FIGS. 8 and 9. The swivel joint has a manifold 80 with a tubular sleeve portion 81 enclosing a sleeve chamber 82. At each end, the sleeve chamber 82 is closed off by an annular wall or rib 83 having as its radially inner surface the axial bore 84. The shaft portion 85 of the swivel body member fits freely within axial bore 84 and has a cylindrical outer surface 86. An annular recess 88 in the outer end of sleeve portion 81 is formed by the outer end surface 89 of rib 83 and by cylindrical side wall surface 90. The end of sleeve portion 81 has a radially extending face 91, and side wall surface 90 is provided with a chamfer 92 adjacent end face 91 to form a guide for insertion of the sealing ring 94 into recess 88. Sealing ring 94 is basically similar to the sealing ring 34 shown in FIGS. 1 through 7. Before the ring is installed, it is approximately circular in cross section, having relatively thin, flexible walls 95 which surround an annularly extending internal chamfer 96. The axially inner portion of the ring wall 95 is cut away to form an annular gap 97 which extends continuously around the ring face. Adjacent gap 97, the radially outer portion of the ring wall 95 forms a rounded outer edge 98 of this same thickness as the remainder of the ring wall. On the inner side of the annular gap 97, the ring wall 95 is thickened to form a stiffening rib 99 having a radially extending face 100 which abuts against the outer surface 89 of the annular rib 83.

To permit the fluid under pressure within sleeve chamber 82 to find admittance into the annular chamber 96 within sealing ring 94, a passageway is provided in the form of spiral grooves 101 cut in the radial face 100 on the thickened rib portion 99. As shown in FIG. 9a, the spiral grooves 101 start at the inner edge of the face 100 and terminate at the outer edge of the face 100. Fluid within sleeve chamber 82 passes outward through the clearance space between axial bore portion 84 and cylindrical shaft surface 86 to sealing ring 94, from which point the fluid can pass through the passageway formed by spiral grooves 101 and end surface 89 of annular rib 83 to pass through annular gap 97 into the annular chamber 96. While spiral grooves 101 have been shown as having a relatively fine pitch, the nature and direction of these grooves may be varied so long as adequate contact surface is left on radial face 100 for proper engagement with end surface 89. It is understood that grooves 101 can also have a course spiral pitch or can extend radially outward across face 100.

The sealing ring 94 is held in place by means of a nut 105 making a self locking threaded engagement on the threaded end 87 of shaft portion 85. Nut 105 has a radially extending face 106 to make engagement with and compress the sealing ring 94 in the same manner as described heretofore in conjunction with the embodiment shown in FIGS. 1 to 3. It will be understood that the embodiment shown in FIGS. 8 and 9 is similar to that shown in FIGS. 1 to 3 except that the fluid is admitted to the interior of the sealing ring through spiral grooves 101 formed into the sealing ring rather than through the passages 41 formed into the manifold member.

The sealing ring of the present invention may also be employed to provide a fluid seal for an axially sliding member, as well as a rotary member as in the embodiments heretofore described. FIG. 10 shows a fluid pressure cylinder motor 110 having a fluid chamber 111 closed off at the end by an annular wall or rib 112 to form an axial bore 113. A piston rod 114 is shown as being freely slidable within axial bore 113 to pass outward through the cylinder. Axially outward of annular rib 112 is a recess 115 formed by end surface 116 of annular rib 112 and side wall surface 117. Within recess 115 is fitted a sealing ring 118 shown as being of the same type shown in FIGS. 8 and 9. To secure the sealing ring 118 in position, the axially outer portion of side wall surface 117 is provided with internal screw threads 119 to receive a nut 120 having a radially extending face 121 adapted to compress and shape the sealing ring 118 into its normal sealing fit. It will be noted that nut 120 is provided with axial bore 122 to allow the piston rod 114 to slide freely therethrough.

When nut 120 is fully tightened in place, the sealing ring 118 is compressed and shaped to make sealing contact against the piston rod 114 and side wall surface 117 in the aforedescribed manner. The rigidity of the sealing ring when compressed and filled with fluid allows the ring to serve not only as a metal to metal seal to prevent escape of fluid outward along the surface of piston rod 114, but also as the bearing for the piston rod which makes a clearance fit with both axial bore 113 and nut bore 122. Thus not only is a fluid tight seal provided by the sealing ring 118, but the need for additional bearings for piston rod 114 are normally unnecessary.

While the sealing ring shown in the drawings and described hereinabove have been described as being preferably made of metal, it is understood that the sealing ring may also be made out of suitable non-metallic materials and may be made according to methods other than that herein described. It is understood, however, that when the sealing ring is distorted out of its normal circular cross-sectional shape, either by the compression of installation or by fluid pressure, that such distortion should not strain the ring beyond its elastic limit, so that when the compression is released during disassembly of the joint, the ring will return to its normal uncompressed shape and be suitable for reassembly and reuse as often as desired.

Although several embodiments of the invention have been shown and described in detail, together with a method of making the sealing ring of the invention, other modifications and rearrangements, together with other manufacturing methods, may be resorted to by those skilled in the art without departing from the invention, the scope of which is set forth in the following claims.

What is claimed is:

1. A sealing ring of resilient material for use in a confined annular recess, said sealing ring having a wall defining an annular chamber, said wall having an annular gap on an axially facing side of said sealing ring, the radially inner edge of said wall adjacent said gap being formed with an annular rib of greater axial and radial thickness than the remainder of said wall, said remainder of said wall being of substantially uniform thickness, said rib having an outer diameter less than the outer diameter of said ring and said rib having an inner diameter greater than the inner diameter of said ring, said rib having a radially extending face, and a groove in said face extending between the inner and outer edges thereof.

2. A sealing ring of resilient material for use in a confined annular recess, said sealing ring having a wall defining an annular chamber, said wall having an annular gap on an axially facing side of said sealing ring, the radially inner edge of said wall adjacent said gap being formed with an annular rib of greater axial and radial thickness than the remainder of said wall, said remainder of said wall being of substantially uniform thickness, said rib having an outer diameter less than the outer diameter of said ring and said rib having an inner diameter greater than the inner diameter of said ring, said rib having a radially extending face, and at least one spiral groove in said face, said spiral groove interconnecting the inner and outer edges of said face.

3. A sealing ring of resilient material for use in a confined annular recess having a pair of parallel axially spaced radial walls and an axial wall connecting said radial walls, said sealing ring having a wall defining an annular chamber of substantially circular cross-section, said wall having an annular radial gap on an axially facing side of said sealing ring, one edge of said wall adjacent said gap being formed with an annular rib of greater axial and radial thickness than the remainder of said wall, said remainder of said wall being of substantially uniform thickness, said rib having an outer diameter less than the outer diameter of said ring and said rib having an inner diameter greater than the inner diameter of said ring, said rib having a radially extending planar face adapted to make abutting contact with a radial side wall of said recess and the other edge of said wall adjacent said gap also making contact with the same radial side wall engaged by said rib.

4. A sealing ring of resilient material for use in a confined annular recess, said sealing ring having a wall defining an annular chamber, said wall having an annular gap on an axially facing side of said sealing ring, one edge of said wall adjacent said gap being formed with an annular rib of greater axial and radial thickness than the remainder of said wall, said remainder of said wall being of substantially uniform thickness, said rib having an outer diameter less than the outer diameter of said ring and said rib having an inner diameter greater than the inner diameter of said ring, said rib having a radially extending face, and a groove in said face extending between the inner and outer edges thereof.

5. A sealing ring of resilient material for use in a confined annular recess, said sealing ring having a wall defining an annular chamber, said wall having an annular gap on an axially facing side of said sealing ring, one edge of said wall adjacent said gap being formed with an annular rib of greater axial and radial thickness than the remainder of said wall, said remainder of said wall being of substantially uniform thickness, said rib having an outer diameter less than the outer diameter of said ring and said rib having an inner diameter greater than the inner diameter of said ring, said rib having a radially extending face, and at least one spiral groove in said face, said spiral groove interconnecting the inner edges and outer edges of said face.

6. A sealing ring of resilient material for use in a confined annular recess having a pair of parallel axially spaced radial walls and an axial wall connecting the outer edges of said radial walls, said sealing ring having a wall defining an annular chamber of substantially circular cross-section, said wall having an annular radial gap on an axially facing side of said sealing ring, the radially inner edge of said wall adjacent said gap being formed with an annular rib of greater axial and radial thickness in the remainder of said wall, said remainder of said wall being of substantially uniform thickness, said rib having an outer diameter less than the outer diameter of said ring and said rib having an inner diameter greater than the inner diameter of said ring, said rib having a radially extending planar face adapted to make abutting contact with a radial side wall of said recesss and the outer edge of said wall adjacent said gap also making contact with the same radial side wall engaged by said rib.

References Cited in the file of this patent

UNITED STATES PATENTS

| | | |
|---|---|---|
| 549,419 | Wright | Nov. 5, 1895 |
| 631,661 | Perry | Aug. 22, 1899 |
| 876,977 | Larrson | Jan. 21, 1908 |
| 1,499,126 | Severn | June 24, 1924 |
| 1,727,184 | Thompson | Sept. 3, 1929 |
| 2,481,404 | Donner | Sept. 6, 1949 |
| 2,542,141 | Horton | Feb. 20, 1951 |
| 2,626,839 | Creson et al. | Jan. 27, 1953 |
| 2,772,897 | Shaw | Dec. 4, 1956 |
| 2,867,482 | Schmidt | Jan. 6, 1959 |

FOREIGN PATENTS

| | | |
|---|---|---|
| 3,068 | Great Britain | of 1872 |
| 1,174,936 | France | Mar. 8, 1959 |